(No Model.)
F. GLEASON.
SECTIONAL PNEUMATIC TIRE.
No. 484,420. Patented Oct. 18, 1892.
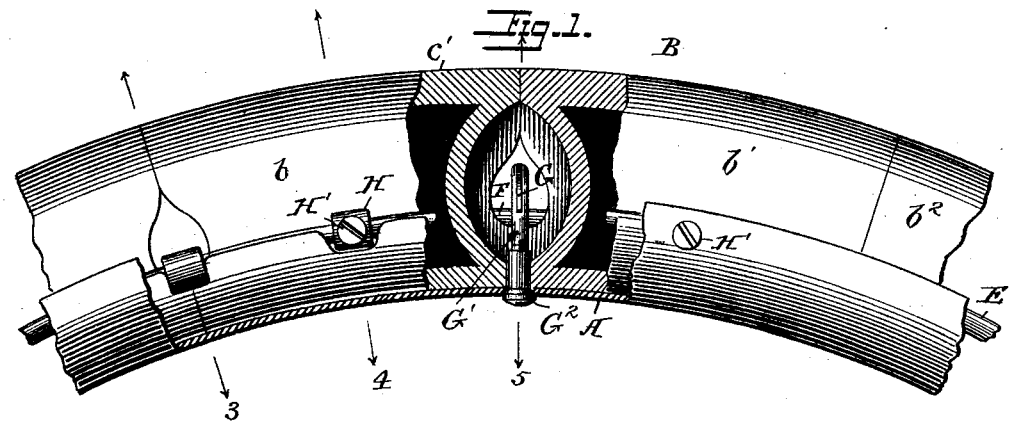
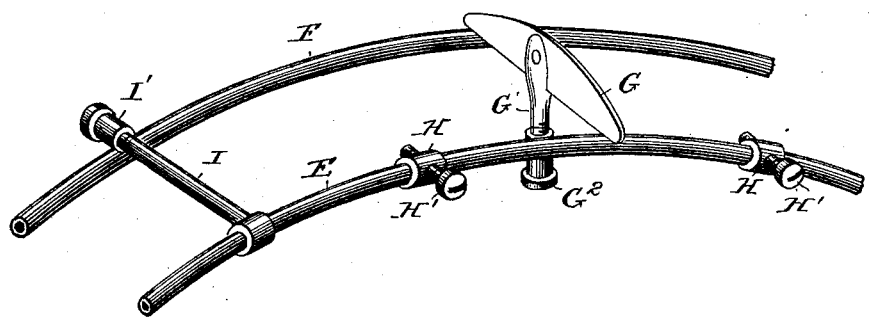
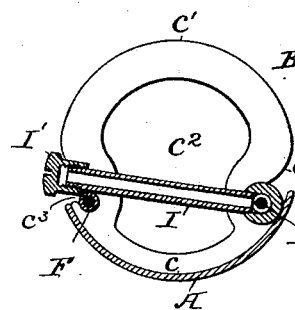 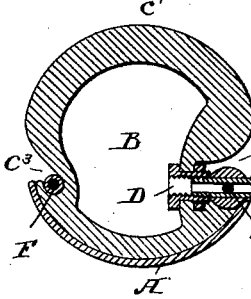 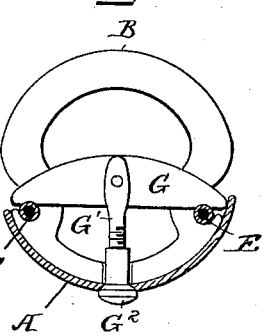
Witnesses
Jno. G. Hinkel
Alec N. Dobson
Inventor
Frances Gleason
By
Foster Freeman
Attorneys
THE NORRIS PETERS CO., PHOTO-LITHO., WASHINGTON, D. C.

United States Patent Office.

FRANCIS GLEASON, OF PHILADELPHIA, PENNSYLVANIA.

SECTIONAL PNEUMATIC TIRE.

SPECIFICATION forming part of Letters Patent No. 484,420, dated October 18, 1892.

Application filed February 27, 1892. Serial No. 423,041. (No model.)

*To all whom it may concern:*

Be it known that I, FRANCIS GLEASON, a citizen of the United States, and a resident of Philadelphia city and county, and State of Pennsylvania, have invented certain new and useful Improvements in Sectional Pneumatic Tires, of which the following is a specification.

My invention relates to pneumatic tires for vehicles, and is designed more especially for tires for bicycles, although, of course, the invention can be applied to any kind of a wheel.

The object of the invention is to provide a pneumatic tire which is made up of sections, each section of which is independently removable from the tire, and, further, to provide means whereby the sections may be independently inflated and closed, the means of inflation being capable of operating to inflate any one or more or all of the sections simultaneously, and, further, to provide simple and effective means whereby the various sections of the tire may be held in position and readily removed when desired.

To these ends my invention consists in the various features of construction, arrangement, and mode of operation, substantially such as are hereinafter more particularly pointed out.

Referring to the accompanying drawings, Figure 1 is a side view, partially in section, of a portion of a wheel, showing my improved device applied thereto. Fig. 2 is a detached perspective view showing the inflating-tube and means for holding the sections in place. Figs. 3, 4, and 5 are respectively transverse sections on the lines 3, 4, and 5 of Fig. 1.

In the large and growing use of inflated tires for vehicles, and especially for bicycles, it is desirable to provide an inflated tire which not only shall be capable of being readily and quickly inflated and capable of maintaining the inflated condition, but which if perchance an accident should happen to the tire the whole tire shall not be rendered useless.

As a means of accomplishing this end, one feature of my invention consists in making the inflated tire of separate and independent short sections, which sections are held in place on the rim of the wheel by some suitable mechanism, but which, also, can be readily and independently separated from the adjoining sections, so that it can be repaired or a new section substituted in its place, the object being that a rider can carry with him, if necessary, one or more of the independent sections, and in case of accident—as by a perforation of the inflated section—the injured section can be withdrawn and another put in its place and inflated in a very short time and without any special tools or appliances.

Another feature of my invention relates to the manner of attaching these independent detachable sections to the rim, and to do this effectively and cheaply I utilize the inflating means as elements in holding the sections in place. Further, I so arrange the inflating means that any one or more or all of the sections can be simultaneously inflated, and when once inflated the air or other fluid may be secured in the separate sections.

Referring to the accompanying drawings, A represents the rim or flange of a wheel, which in this case is shown as curved and as being made, preferably, of metal, and constitutes a continuous felly, and may be supported in the usual way by spokes or otherwise. Mounted in this felly or rim is the tire B, and this tire is made up of a number of separate and independent sections $b$ $b'$ $b^2$, &c. Each of these sections is made to form a segment of the tire and to be complete in itself, having, preferably, a bearing-surface $c$, conforming to the curvature of the rim, a wearing-surface $c'$, preferably rounded and closed at one end by a partition $c^2$, which is preferably concave on its outer surface, so as to form a space between the adjacent ends of the two sections to permit the means hereinafter described to be placed between the sections, and, further, to render the sections more elastic, this space allowing room for the ends of the sections to bulge out more or less under pressure from the wearing-surface of the tire. The sides of each section are preferably formed with grooves or recesses $c^3$ $c^4$, and each individual section is provided with a nut or vent-piece D, molded into its wall.

The sections, constructed substantially as above described, are arranged around the periphery of the rim, and in order to provide a ready means for inflating them I make use of a hollow tube E, extending around the wheel and fitting into one of the ribs or notches $c^4$ in the sides of the sections, while the other rib or notch $c^3$ on the other side may be provided with a similar tube F, or, as this tube does not have to be connected with the air-passages, it may be a simple wire; but the two wires or tubes E F pass along the sides of the independent sections, fitting the recesses therein, and serve to retain the sections in place. In order, however, to secure the holding of the sections against any possible displacement, at intervals around the periphery of the wheel I provide a holding device consisting of a bar G, (shown in the form of a flat bar extending between the ends of two adjacent sections and the ends of the bar resting upon the tubes E and F,) while projecting from the bar is a standard or arm $G'$, to which is screw-threaded a nut $G^2$, passing through an opening in the center of the rim, and it will be readily seen that by this means the bar can be caused to bear tightly upon the tubes E and F and prevent any accidental displacement thereof. Connected with the tube at suitable distances apart to correspond with the various sections are the hollow screws H, each of which is provided with an opening $h$, and these screws are preferably fitted in enlargements $H'$ in the tube E, although, of course, the tube itself may be of sufficient size to receive the screws. These screws are arranged to fit and screw into the vent or nut D, secured in the body of each section, and in this way the screws furnish a communicating passage-way between the tube E and the interior of the various sections of the tire. It will be seen that when the screw is in the position shown in Fig. 1 the port or opening $h$ furnishes a communication between the tube and the hollow portion of the screw, forming a valve; but when the screw is turned a quarter-way round this opening is closed and the valve is shut, confining the air in the various sections of the tire. I preferably have these openings in the screws corresponding with the notch in the head of the screw, so that the notches serve as an indicator as to the position of the valve. It will thus be seen that each independent section has an independent connection with the hollow tube and that the hollow screw not only acts as an air-passage or connection between the tube and the section, but operates as a valve to confine the air in the section when once inflated.

In order to provide means for readily furnishing the air to the tires, I secure to the hollow tube E a tube I, which preferably extends between the adjacent ends of two independent segments and is provided with a cap-screw $I'$, and to this pipe or tube may be connected a pump or other means for forcing the air into the tube and thence into the next section.

Such being the preferred construction of the device, although it is to be understood that I do not limit myself to the precise construction and arrangement shown, as they can be varied without departing from my invention, the operation can be understood and is as follows: The sections $b$ $b'$ being put in place on the rim and the tube E and the wire or tube F being slipped into position in the recesses on the sides of the sections and the bar G being also put in position between the adjacent ends of the sections and secured, the various segments will be held firmly in place. The hollow screws H are then screwed into the sockets or vents D, formed in the body of each section, and are left in a position to have their openings $h$ correspond to the passage-way in the tube E. Air is then forced through the tube I into the tube E and distributes itself evenly throughout the circumference of the wheel, and each section is evenly and thoroughly inflated. The screws H are then turned a quarter-round, for instance, so that they form an effectual close valve for each independent section, and the wheel is ready for use. If, perchance, any one of the sections should become injured, as by being perforated or otherwise, in order to substitute a perfect section therefor it is only necessary to withdraw the screw H from the vent or separate piece to loosen the screw-cap $G^2$ and allow the tube to become slack, or, perchance, move slightly to one side, when the injured section can be readily taken out and a new section replaced therefor, when on again tightening this screw-cap $G^2$ and connecting the hollow screws H with the bent tube of the section this section can be inflated to correspond with the pressure in all the others, and the wheel is ready for use again and in perfectly-operative condition. If, perchance, the user does not have a new section for immediate use in replacing an old section, it will be readily observed that notwithstanding one of the sections becomes injured the wheel could be used to a greater or less extent, as each section is not only independent in itself, but is independently connected with the inflating means, and the fact that one section was perforated and would not retain its inflated condition would in no wise impair or interfere with the other sections maintaining their true or inflated condition, and the wheel would be perfect in all its parts, except the particular section injured, and this would not interfere materially with the operation of the wheel. Moreover, it will be observed that in making the tire of independent sections it is less liable to burst from air-pressure than if it were made in a single tube or the sections of the tube were connected together with free air-passages, and it will be further observed that each section has its own independent end walls, which not only strengthen them, but prevent a breakage in one of the ends in more than one of the sections.

What I claim is—

1. A pneumatic tire for vehicles, consisting of separate and independent hollow sections and an inflating device connected to each of the sections and provided with means for independently closing the communication between the inflating device and each independent section.

2. A pneumatic tire for vehicles, consisting of separate and independent hollow sections, each provided with an inlet-nut secured in the walls of the respective sections, and an inflating device provided with hollow connections between the inflating device and each inlet-nut, substantially as described.

3. A pneumatic tire consisting of a number of independent and separate hollow sections, each provided with an inlet-nut and an inflating-tube for all the sections, and independent hollow connections between the tube and each inlet-nut, substantially as described.

4. A pneumatic tire consisting of the separate and independent hollow sections, each provided with an inlet-nut and an inflating-tube, and hollow screws connected to the tube, fitting the inlet-nuts, substantially as described.

5. In a pneumatic tire, the combination, with the independent sections having an inlet-nut, of a hollow tube, independent hollow screws having an opening in the tube and connected to the nut and serving as a passage-way between the tube and sections, and an independent valve to close the sections, substantially as described.

6. In a pneumatic tire, the combination, with the independent hollow sections having recesses in their sides, of the wires or tubes fitting said recesses, one of which is hollow and serves as an inflating device, and connections between the tube, and independent connections between the tube and each section of the tire, substantially as described.

7. In a pneumatic tire, the combination, with the independent hollow sections having recessed sides, of the wires or tubes fitting the sides of the sections, a cross-bar resting on the wires or tubes and extending between the ends of the adjacent sections, and means for tightening said bar, substantially as described.

8. In a pneumatic tire, the combination, with the independent hollow sections, the inflating-tube extending around one side thereof and having independent connections with each section of the tire, of the tube I, provided with a cap and arranged to inflate the sections, substantially as described.

9. A pneumatic tire comprising the independent hollow sections, the end portions of which are in the form of inward curves forming a space between the adjoining sections permitting the expansion of the end portions, substantially as described.

10. In a pneumatic tire, the combination, with the sections and inflating device, of a connection between the inflating device and the sections, serving both as a passage-way of the air to the sections and a valve to close the sections, substantially as described.

11. In a pneumatic tire, the combination, with the independent sections having an inlet secured in their sides, of an inflating-tube passing around the wheel at the side of the sections and serving to hold the sections in place and connections between the tube and each independent section, substantially as described.

In testimony whereof I have signed my name to this specification in the presence of two subscribing witnesses.

FRANCIS GLEASON.

Witnesses:
SAMUEL P. COURTNEY,
JOSEPH RICHARDSON.